United States Patent
Hagen

(10) Patent No.: US 11,220,900 B2
(45) Date of Patent: Jan. 11, 2022

(54) DOWNHOLE NETWORK INTERFACE UNIT FOR MONITORING AND CONTROL

(71) Applicant: HALLIBURTON ENERGY SERVICES, INC., Houston, TX (US)

(72) Inventor: Trond Hagen, Sandefjord (NO)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/457,456

(22) Filed: Jun. 28, 2019

(65) Prior Publication Data

US 2020/0408087 A1 Dec. 31, 2020

(51) Int. Cl.
*E21B 47/12* (2012.01)
*E21B 17/00* (2006.01)
*H04B 3/54* (2006.01)

(52) U.S. Cl.
CPC ............ *E21B 47/12* (2013.01); *E21B 17/003* (2013.01); *H04B 3/54* (2013.01)

(58) Field of Classification Search
CPC ......... H04B 47/12; H04B 17/003; H04B 3/54
See application file for complete search history.

(56) References Cited

U.S. PATENT DOCUMENTS

| | | |
|---|---|---|
| 3,986,393 A | 10/1976 | Hawley |
| 5,959,547 A | 9/1999 | Tubel et al. |
| 5,960,883 A | 10/1999 | Tubel et al. |
| 6,252,518 B1 * | 6/2001 | Laborde .................. E21B 47/12 340/855.3 |
| 6,300,750 B1 | 10/2001 | Oglesbee et al. |
| 6,369,718 B1 | 4/2002 | Mathieu |
| 7,139,218 B2 | 11/2006 | Hall et al. |
| 7,525,264 B2 | 4/2009 | Dodge |

(Continued)

FOREIGN PATENT DOCUMENTS

| | | |
|---|---|---|
| CN | 103580104 | 2/2018 |
| EP | 0493579 | 12/1995 |

(Continued)

OTHER PUBLICATIONS

U.S. Appl. No. 16/457,718 , "Non-Final Office Action", dated Feb. 21, 2020, 9 pages.

(Continued)

*Primary Examiner* — Amine Benlagsir
(74) *Attorney, Agent, or Firm* — Kilpatrick Townsend & Stockton LLP

(57) ABSTRACT

A downhole networking interface unit provides conversion between multiple native format signals of downhole instruments to power line communication messages exchanged with a controller positionable at the surface of a wellbore. Certain aspects and features provide methods of power line communication. In one aspect, a computing device may send and receive messages in a power line communication format over a cable to and from at least one downhole device. The computing device may send and receive messages in the power line communication format to and from a network interface unit that can be coupled to the cable. The network interface unit may have multiple interfaces for communicating downhole using differing types of native signals for differing types of downhole devices such as sensor, instruments, and inductive couplers.

18 Claims, 4 Drawing Sheets

(56) References Cited

U.S. PATENT DOCUMENTS

| | | |
|---|---|---|
| 7,649,474 B1 | 1/2010 | Gard |
| 8,330,612 B2 | 12/2012 | O'Neill et al. |
| 8,330,615 B2 | 12/2012 | Hagen |
| 8,339,276 B2 | 12/2012 | Mandal et al. |
| 8,353,336 B2 | 1/2013 | Neuhaus et al. |
| 8,857,507 B2 | 10/2014 | Freeman |
| 9,683,438 B2 | 6/2017 | Fanini et al. |
| 2005/0284663 A1 | 12/2005 | Hall et al. |
| 2008/0196887 A1 | 8/2008 | Mccoy et al. |
| 2008/0247273 A1 | 10/2008 | Chemali et al. |
| 2008/0272932 A1 | 11/2008 | Booker et al. |
| 2010/0117854 A1 | 5/2010 | Hagen |
| 2012/0268288 A1* | 10/2012 | Cousin ................. G01V 11/002 340/854.7 |
| 2013/0106615 A1 | 5/2013 | Prammer |
| 2013/0206387 A1* | 8/2013 | Deville .................. E21B 41/00 166/66.4 |
| 2013/0307700 A1 | 11/2013 | Hassan et al. |
| 2014/0292530 A1 | 10/2014 | Weerasinghe et al. |
| 2015/0061390 A1 | 3/2015 | Zhang et al. |
| 2016/0084076 A1* | 3/2016 | Fanini .................... H04L 67/12 340/853.1 |
| 2019/0235007 A1* | 8/2019 | Williamson .......... E21B 34/066 |

FOREIGN PATENT DOCUMENTS

| | | |
|---|---|---|
| EP | 1637695 | 3/2006 |
| WO | 2013148510 | 10/2013 |
| WO | 2014127489 | 8/2014 |
| WO | 2016094021 | 6/2016 |

OTHER PUBLICATIONS

U.S. Appl. No. 16/457,718 , "Notice of Allowance", dated May 7, 2020, 7 pages.

PCT/US2019/039954 , "International Search Report and Written Opinion", dated Mar. 27, 2020, 14 pages.

PCT/US2019/039995 , "International Search Report and Written Opinion", dated Mar. 31, 2020, 12 pages.

Application No. PCT/US2020/030269 , International Search Report and Written Opinion, dated Aug. 3, 2020, 16 pages.

* cited by examiner

DOWNHOLE NETWORK INTERFACE UNIT FOR MONITORING AND CONTROL

TECHNICAL FIELD

The present disclosure relates generally to downhole communications. More particularly, the present disclosure relates to a system that can provide downhole communications via power line communication.

BACKGROUND

In wells for hydrocarbon extraction, understanding the structure and properties of the associated geological formation provides information to aid such exploration. The physical conditions inside the wellbore can be monitored to ensure proper operation of the well. A wellbore is a challenging environment, with temperatures that can approach 150 degrees C. (302 degrees F.), 175 degrees C. (347 degrees F.), or even 200 degrees C. (392 degrees F.), and pressures that can approach 25 kpsi (172 MPa, or about 1700 atmospheres), or even 30 kpsi (207 MPa, or about 2000 atmospheres). There is ongoing effort to develop systems and methods that can allow for more flexibility without significant loss of precision in systems and techniques to communicate efficiently downhole.

DETAILED DESCRIPTION

Figure 1:
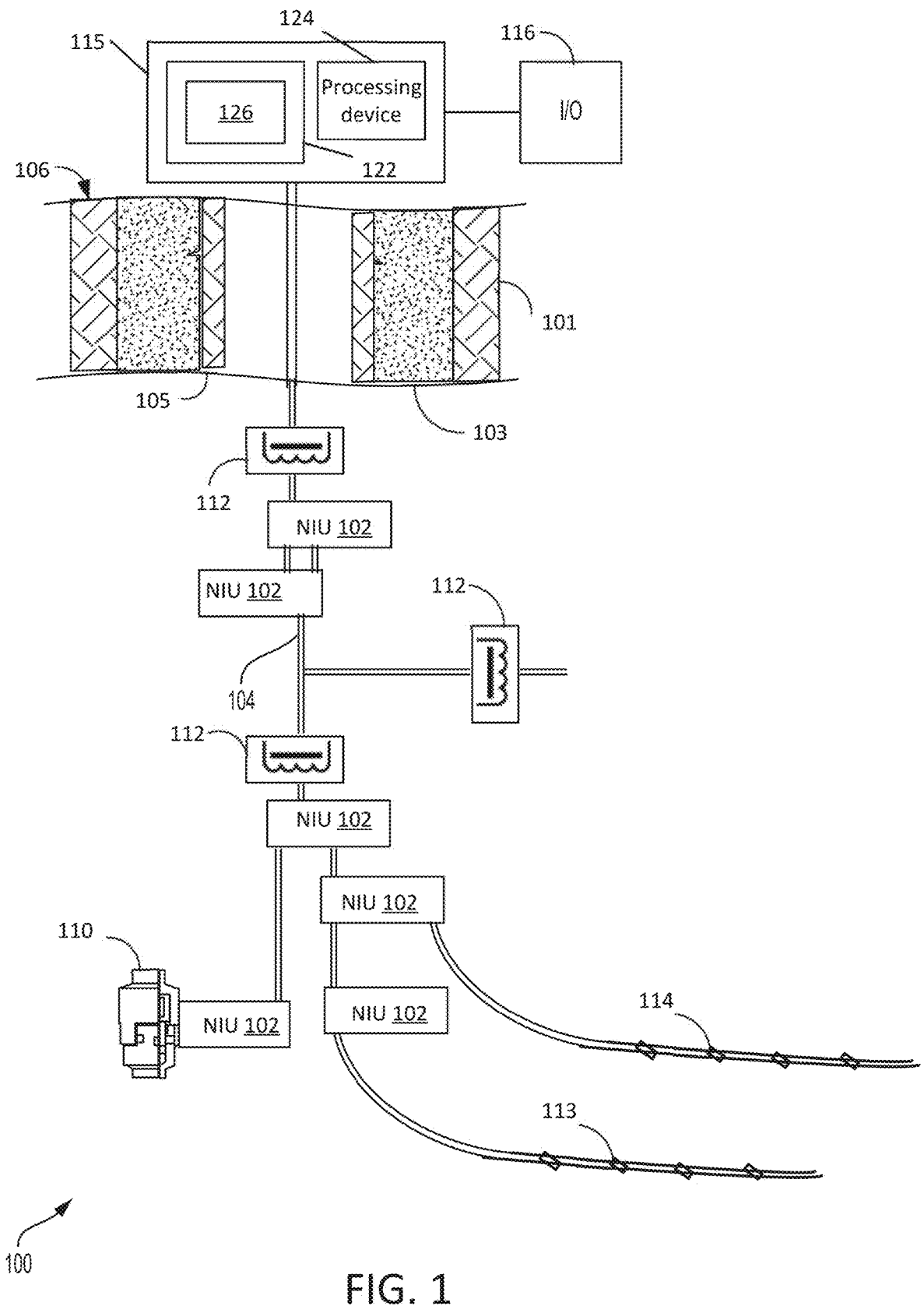
FIG. 1 is a schematic view of a well that includes a system for making measurements and controlling downhole devices in a wellbore according to some aspects of the disclosure.

Certain aspects and features relate to power line communication by a network interface unit in a downhole environment. Certain aspects and features provide a method of communication from downhole instruments that provide native format signals to the network interface unit. The network interface unit may convert the native format signals from the downhole instruments to a power line communication signal to be sent to a surface instrument, controller, or computing device. Certain aspects and features provide a method of communication from a surface instrument, controller, or computing device using power line communication, where the network interface may convert the power line communication signal to and from native format signals. For example, the operations of a downhole instrument may require communication or control to or from a surface controller. Certain aspects and features of this disclosure relate to converting messages in a native communication format to or from a power line communication format.

A native signal format is a format used by a downhole device. As examples, a downhole device may use a switched DC signal, some devices use pulse-width-modulation format signals, some devices use serial or parallel digital signal formats, some devices use modulated radio frequencies, some devices use analog voltage signals, etc. A power line communication format is any signal format that can encapsulate or carry messages over a downhole power line such as a tubing encapsulated cable. Power line communication signals include those with modulated carriers at frequencies from 3 kHz to 250 MHz, as well as signals that are sent by modulating the current or voltage on the power line. A tubing encapsulated cable usually includes one or more conductors, insulation, and an encapsulation layer to protect the cable in the harsh environment of a well. Such a cable can be used to power downhole devices.

Currently, well operators use many different types of downhole devices. Typically, each type of downhole device operates using its own communication protocol and control system. A well operator therefore needs to deal with a growing number of sensors, actuators, and technologies to use in operating a well. Current systems require one expensive downhole cable and a topside controller card per sensor or actuator system, leading to multiple cables running downhole from the surface. Certain aspects and features provide a network solution that ties together many different functions and technologies. One component of the solution is a downhole network interface unit (NIU), which ties together multiple protocols and communication techniques to enable the use of one communication protocol to and from an uphole controller to exchange communication with various downhole devices. Commands or data being sent to and from downhole devices can be encapsulated in the one communication protocol.

Certain aspects and features provide for the use of a mix of sensors and actuators in same communication system, without the need to implement multiple communication protocols at the surface, or to monitor network integrity for multiple types of communication systems. Certain aspects and features provide for the use of multiple network nodes in the downhole environment. Certain aspects and features provide for the use of all-electric systems on a single tubing encapsulated cable, including inductive couplers. All-electric downhole systems can improve reliability by replacing hydraulic control systems with electric control systems.

Certain aspects and features provide methods of power line communication. In one aspect, a computing device may send and receive power line communication messages over a cable to ultimately reach at least one downhole device. The computing device may exchange power line communication messages with a network interface unit that can be coupled to the cable. The network interface unit may have multiple interfaces for communicating downhole using differing types of native signals for differing types of downhole sensors, actuators, or instruments, or in order to have properties optimized for use with inductive couplers or external wireless modems. In some cases, the network interface unit may contain a processing unit that executes instructions or applications to cause the network interface unit to communicate between the downhole device and the computing device by converting an information format between any of the differing types of native signals and a power line communication format.

In one example, a tubing encapsulated cable is disposed in a downhole environment that connects to a surface computing system and various downhole devices. A network interface unit can be coupled to the tubing encapsulated cable and a sensor or actuator circuit downhole. The network interface unit can appear transparent by providing conversion from or to the native format signal from the sensor or actuator to or from a format appropriate for power line communication, thus creating a transparent communication channel downhole.

In some examples, the network interface unit includes a data memory operable of storing data from a downhole device. In some examples, the network interface unit includes a switch for controlling an electrical power connection from the cable to the downhole device. In some examples either a surface controller, the network interface unit, or both can shape communication messages to reduce complexity of decoding. In some examples, the network interface unit includes an equalizer module for compensating for a cable transfer distortion within the cable.

In some examples, messages can include multiple node addresses. The network interface unit can repeat the power line communication messages to additional network interface units downhole based on the node addresses in order to reach nodes that are far away from the surface or the source of a message.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 schematically illustrates an example well that includes a system 100 for networked communication in a wellbore according to some aspects. System 100 illustrates multiple alternative aspects of networked downhole communication, however, these aspects can be implemented independently. In system 100, a cable 104 to the surface 106 provides electrical power and communication to a downhole sensor or actuator in a wellbore. In some examples, cable 104 may be a tubing encapsulated cable (TEC) that connects to a network interface unit (NIU) 102 downhole. In the example of FIG. 1, multiple NIUs form a network. The cable 104 may connect to a topside controller 115, which in turn includes a memory device 122, a processing device 124, and computer program code instructions 126 for causing processing device 124 to communicate downhole with network interface units 102. The processing device 124 can include one processing device or multiple processing devices. Non-limiting examples of the processing device 124 include a field-programmable gate array ("FPGA"), an application-specific integrated circuit ("ASIC"), a microprocessing device, etc.

The non-volatile memory device 122 may include any type of memory device that retains stored information when powered off. Non-limiting examples of the memory device 122 include electrically erasable and programmable read-only memory ("EEPROM"), flash memory, or any other type of non-volatile memory. In some examples, at least some of the memory device 122 can include a non-transitory computer-readable medium from which the processing device can read instructions. A computer-readable medium can include electronic, optical, magnetic, or other storage devices capable of providing computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions.

The NIUs 102 may connect to a variety of downhole devices via TEC 104. Examples of downhole devices include valve actuator 110, inductive couplers 112, sensors 113 and sensors 114 for making measurements, for example, of pressure or temperature. Any number of network interface units 102 is configurable to connect to the TEC 104. Input may be provided or information may be received through the input/output (I/O) interface 116 connected to topside controller 115. The I/O interface 116 may also provide the necessary signaling for sending and receiving power line communication messages through TEC 104. Topside controller 115 may be implemented, as examples, by a specialized computing device or by a controller card that is installed in general-purpose computing device.

In the particular configuration illustrated in FIG. 1, a casing 105 is cemented in place by cement 103 disposed between well casing 105 and formation wall 101. Tubing-side inductive couplers 112 are communicatively coupled to cable 104. Inductive couplers are used to extend the network wirelessly through some kind of barrier or for connecting units wirelessly when no electric connection is possible or feasible. Such connections may be useful for getting access to side-pockets, behind casing, between completion segments, to well laterals, through wellhead or whenever a wireless connection is wanted for improving reliability, give access to sites otherwise not accessible or when convenient for any other purpose. Throughout this disclosure, the terms coupled or connected can be used to refer to components that are actually coupled or connected together as well as components that are capable of being coupled or connected together but may be separated at times.

In some aspects, the NIUs 102 control the connections between the cable 104, the valve actuator 110, downhole sensors 113, and downhole inductive couplers 112 that are below the NIUs. The NIUs 102 may additionally provide a capability to disconnect the downhole devices such as downhole device 110 from the cable 104 electrically.

In other aspects, the computing device 115 may send and receive power line communication messages over a cable 104 to at least one NIU. The computing device 115 may send and receive power line communication messages from an NIU 102 that can be coupled to the cable 104. The NIU 102 may have multiple interfaces for communicating downhole using differing types of native signals for differing types of downhole sensors and actuators. In some cases, the NIU 102 may contain a processing unit that executes instructions or applications to cause the NIU to communicate between the downhole device and the computing device 115 by converting an information format between any of the differing types of native signals and a power line communication message format. In some configurations, multiple network interface units 102 may be disposed along the cable 104 and coupled to various downhole devices, such as actuator 110, inductive couplers 112, or sensors 113. Any or all of these may be referred to herein as instruments.

Figure 2:
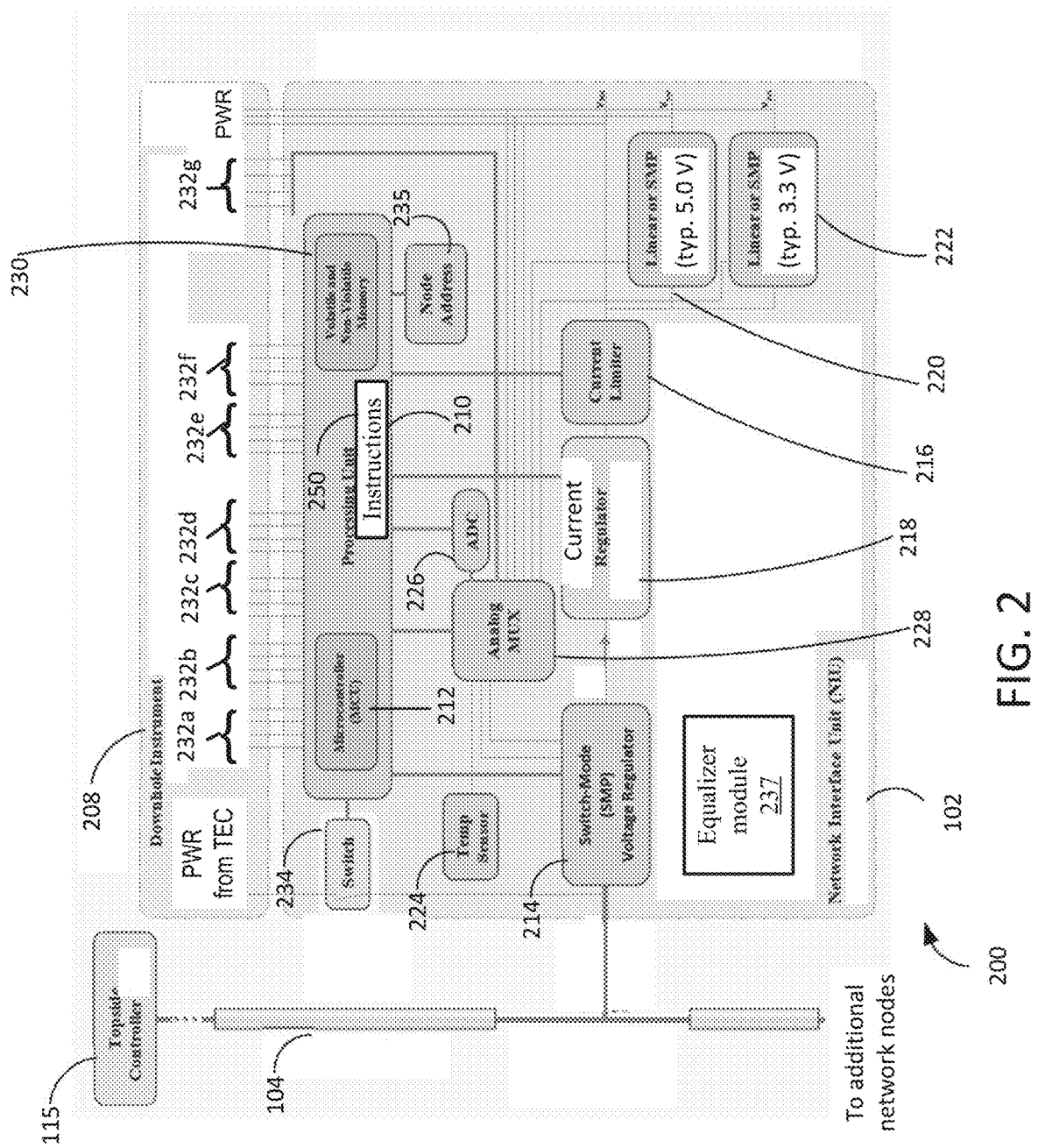
FIG. 2 is a block diagram of a downhole network interface unit according to some aspects of the disclosure.

FIG. 2 is a block diagram of an example of a downhole network communication system according to some aspects. The downhole network communication system 200 includes the controller 115 located at the surface of the wellbore, the cable 104, an NIU 102, and a downhole instrument 208. The cable 104 may be a TEC that provides power (e.g., 100-300 VDC) and communication from the controller 115 to the NIU 102. In some examples, a switch-mode voltage regulator 214 is part of NIU 102 and is couplable to the cable 104.

The NIU 102 may include various components or modules for sending and receiving messages by power line communication as well as providing voltage regulation to the downhole instrument 208. In one example, the NIU 102 includes a processing unit 210. The processing unit 210 can include a microcontroller (MCU) 212 as well as volatile and non-volatile memory 230. Either the processing unit or the MCU can include a processing device or multiple processing devices. Non-limiting examples of the processing device include a field-programmable gate array ("FPGA"), an application-specific integrated circuit ("ASIC"), a microprocessing device, a microprocessor, a digital signal processor, etc.

The processing unit 210 also includes instructions 250, which are stored in non-transitory instruction memory (not shown) or in the non-volatile (non-transitory) portion of memory 230. The instructions are executable by the microcontroller to cause the microcontroller to carry out the communication, protocol conversion, and other functions of NIU 102. The processing unit is couplable to the switch-mode voltage regulator 214 that provides power from the cable 104 to the processing unit 210. The NIU 102 includes a current limiter 216 and various other components such as current regulator 218, linear or switch-mode voltage regulators 220 and 222, temperature sensor 224, analog to digital converter 226, and an analog multiplexer 228. Switch 234 in some examples is a separate switch used in cases where an instrument requires more power than is accessible through the NIU voltage regulators 220. In some example the switch 234 can be part of the NIU 102. The NIU 102 may include power inputs (not shown) that may be connected to in-well power generation. The same voltage regulators can be used whether the power comes from a TEC or from a downhole power generator.

The non-volatile memory within processing unit 210 may include any type of memory that retains stored information when powered off. Non-limiting examples include electrically erasable and programmable read-only memory ("EEPROM"), flash memory, a mask-programmable device, or any other type of non-volatile memory. In some examples, the memory can include a non-transitory computer-readable medium from which the MCU can read instructions 250.

Switch-mode regulator 214 may convert relatively high-voltage (100-300V) power from the TEC cable to lower voltage power to supply to sensors and actuators. For some very high power applications, the NIU 102 unit may also allow the instrument to get direct access to the TEC via switch 234 controlled by the NIU 102. By this, the instrument may use higher power than available through the NIU 102 and still be behind the switch 234. The switch 234 acts as a network integrity barrier controlled by the NIU 102. An advantage of including a switch in the NIU is that the downhole instrument 208 can still be controlled by the NIU 102, even for an instrument where the NIU 102 cannot supply the power requirements of the downhole instrument 208. The switch 234 can be a transistor or other reliable switching element controlled by the NIU 102.

In some configurations, the NIU 102 has separate channels for communication on cable 104 or using a wireless protocol including an internal or external modem (not shown). The NIU 102 can communicate on wired and wireless protocols within a single network configuration. The NIUs 102 may also be positionable as an input device for the secondary sides of inductive couplers of the network system and as an input device for driving the primary sides of inductive couplers. The NIU 102 may also protect itself from thermal issues by shutting down when the temperature sensor 224 detects a critically high temperature condition.

The NIU 102 may be couplable to the downhole instrument 208. An exemplary downhole instrument is an actuator or sensor that can be used to measure or perform various functions within a wellbore. The downhole instrument 208 may communicate in a variety of native formats, including analog, digital, or complex messaging formats. The NIU 102 has multiple communication channels to receive the different native formats from the downhole instrument 208. The NIU 102 converts the different native formats into a format that can be sent to the controller card using a power line communication format along the cable 104. In addition to analog and digital I/Os there may also be dedicated communication ports (such as serial links, I2C, SPI, etc.). Such communication ports are intended to carry messages according to a defined and standardized protocol.

In one example, the NIU 102 has multiple input/output interfaces. For instance, the inputs/outputs 232$a$-232$g$ may provide various native signal formats. In one configuration, the inputs/outputs 232$a$ may be a wireless communication port (e.g., wireless transmitter or receiver), inputs/outputs 232$b$ may be an inductive coupler communication port (e.g., inductive coupler transmitter or receiver), inputs/outputs 232$c$ may be an instrument communication port (e.g., a sensor or actuator transmitter and receiver), inputs/outputs 232$d$ may be a combination of digital and analog channels (e.g., a digital input, digital output, analog input, or analog output). In some examples, inputs/outputs 232$e$, 232$f$, and 232$g$ may be switchable voltage inputs or outputs that may include control lines for each of the switchable voltage inputs or outputs.

In another aspect, the NIU 102 provides electrical power to the downhole instrument 208. For example, controller 115 can send a message by power line communication to the NIU 102 to connect or disconnect electrical power from the downhole instrument 208. The NIU 102 may provide various levels of voltage from the voltage of the cable 104, to the voltage provided by the linear or switch-mode power (SMP) voltage regulators 220 and 222. The linear or SMP regulators may provide lower voltages to the downhole instrument 208. As depicted in the particular example of FIG. 2, the linear or SMP voltage regulators 220 and 222 provide variable voltages from 2 to 12 volts or 2 to 20 volts as examples. 5.0 V and 3.3 V respectively, are examples of voltages that might be set to supply power to typical devices. Other combinations of voltages can be used.

The NIU 102 may be operable at various bit rates. In some aspects, the NIU 102 may operate at an adaptable bit rate, operate using a configurable bit rate, or operate using a fixed bit rate. The NIU 102 may also function as a signal repeater. The controller 115 may add one or more additional node addresses to power line communication messages such that the first node addressed repeats the message and sends it to the next node in the list of addresses. This signal repeater function can be implemented by multiple network interface units positioned along the cable 104 until the communication is received at the destination address. In other configurations, broadcast or multicast messages to groups of downhole devices are possible. NIU 102 in FIG. 3 includes its stored node address 235. Power line communication between surface controller 115 and an NIU 102 can be by either current or voltage modulation at data rates of, as an example, from 30 to 100 kbits per second. NIU 102 may also include an equalizer module 237 to provide cable equalization by compensating for data transfer distortion.

Figure 3:
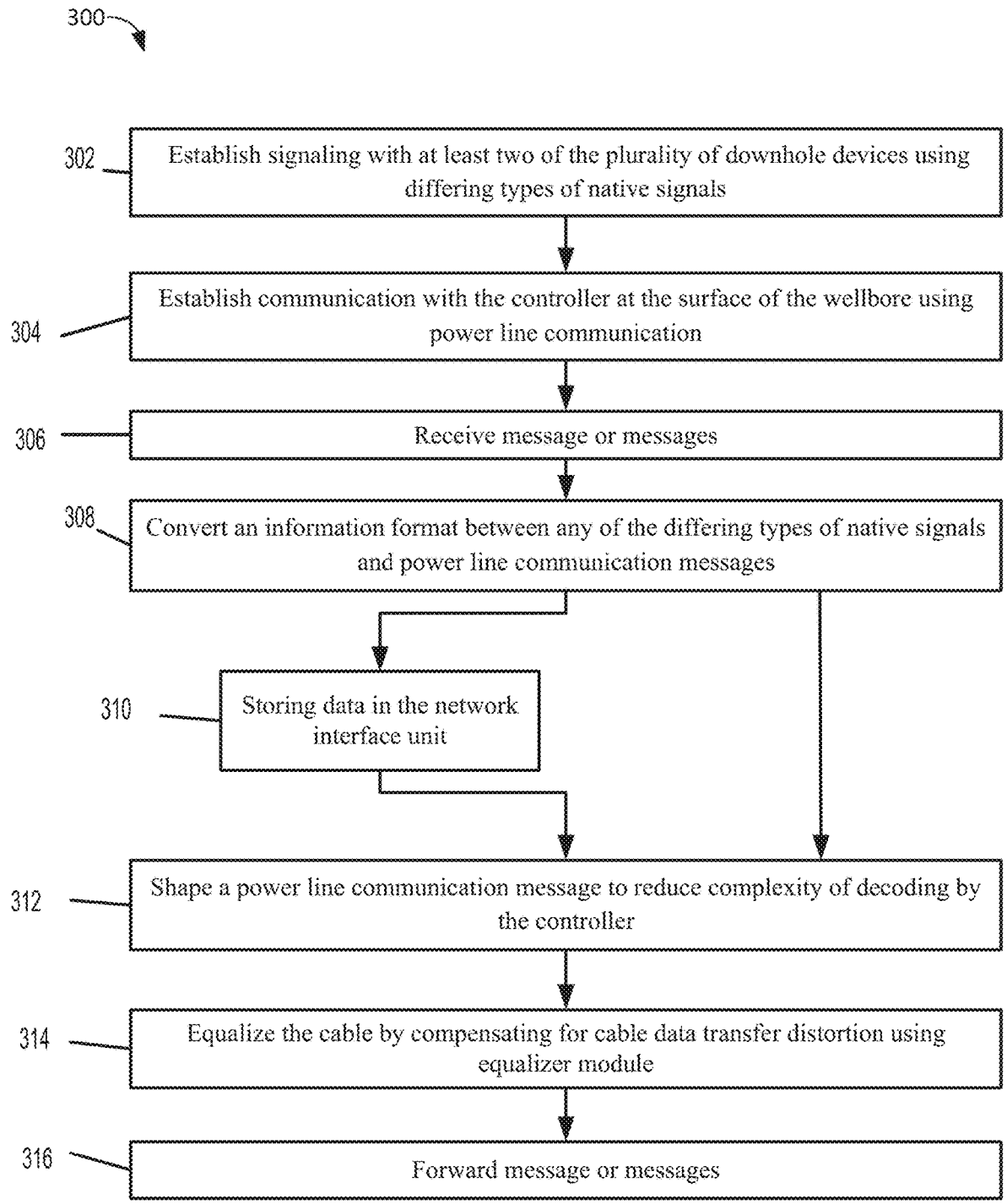
FIG. 3 depicts a process of downhole network communication according to some aspects of the disclosure.

FIG. 3 depicts a process 300 of downhole network communication, according to some aspects. At block 302, a processing unit, such as processing unit 210 establishes signaling with at least two downhole devices using different types of native signaling. For example, an NIU 102 can establish electronic communication with a first downhole device in a first type of native signaling and second downhole device in a second type of native signaling. The NIU 102 may establish communication using a handshake protocol or verification process provided by the respective downhole device.

Taking power and communication signals through inductive couplers requires switching inductive coupler antenna current. Such switched, chopped, or modulated currents will easily disturb any ongoing communication on the TEC. As far as possible, the design for inductive coupler electronics should limit such current fluctuations to a minimum, allowing communication on the network even when inductive couplers are active. The NIU 102 can optimally control inductive coupler switchers to reduce noise levels in a complex downhole network structure where inductive couplers would otherwise induce noise on the TEC.

At block 304, the processing unit establishes communication with the controller at the surface of the wellbore using power line communication. The NIU 102 may establish communication using a handshake protocol or verification process provided by the respective downhole device. In some aspects, any of the network's electrical properties may be monitored by the NIU 102. By monitoring the electrical properties of the network, the controller system may compute how the network performs at various nodes and various inductive couplers. In some configurations, the NIU 102 may capture signal shapes similar to an oscilloscope (e.g., for debugging and general system analysis). The NIU 102 or the controller may then read voltages and currents as well as signal shapes for inductive coupler switching and communication signals.

At block 306, a message or messages are received from uphole or downhole by the NIU. At block 308, the processing unit converts an information format between any of the differing types of native signals and power line communication messages. In an example, the NIU receives information in a native signal format. The NIU converts the native signal format into a communication format suitable for power line communication. In one example, the native signal format can be encoded into a data communication and then modulated onto the current or voltage on the TEC cable. A carrier waveform can also be used.

At block 310, the processing unit optionally stores data in the NIU 102. In some examples, the NIU 102 may store data for power line communication at a later time. The NIU 102 may store the data for power line communication for any length of time as determined by a communication protocol. In alternative configurations, the process 300 may proceed directly from block 306 to block 312 and bypass storage of data on the NIU 102 as illustrated in process 300.

The NIU 102 may have a data memory that can temporarily store data from a downhole instrument 208. For example, the data memory can be incorporated into memory 230 of processing unit 210. The data memory of the NIU 102 may be read from the surface controller unit at various other times. In this configuration, the NIU 102 including the data memory can allow data from multiple downhole instruments 208 to be accessed shortly after each other without waiting for data from slower downhole instruments in the network. Accordingly, the controller may take data samples in parallel, either on response to a broadcast or multicast polling message or by individual messages (e.g., payloads of communication) to each downhole instrument 208. The controller can read back data from the network of downhole sensors at a much higher speed from each of the nodes when all downhole instruments 208 have finished their data sampling.

In a practical example, a downhole network has 30 downhole instruments 208, each with a sampling time of 1 second and a data rate of 300 bits/sec, sampling all downhole instruments 208 would normally take more than 35 seconds to read all instrument data. The NIU 102 including a data memory enables a network data rate of 30 kbit/s, collecting data from all of downhole instruments 208 would take just slightly more than one second, which is a speed increase of more than 30 times. This speed increase allows for downhole instruments 208 to be made slow, and the average response time can still be fast, even in a network with a large quantity of slow downhole instruments 208.

At block 312, the processing unit optionally shapes power line communication message to reduce complexity of decoding by the controller 115. In one example, the NIU 102 may shape a transmitted signal by filtering or otherwise altering the frequency content of the signals. At block 314, the NIU 102 performs cable equalizing (e.g., compensation for cable data transfer distortion). The NIU 102 may monitor the distortion of a communication signal along the cable 104 and provide a compensation voltage or current to the communication or the cable to reduce the effects of cable distortion. At block 316, the message is or the messages are forwarded uphole or downhole in the appropriate format.

To realize additional improved communication properties (for longer cable lengths and/or higher data rates), the NIU 102 can be equipped with features allowing cable equalizing (e.g., compensation of cable data transfer distortion). A signal capture module may be used for analyzing the transfer properties of the cable 104, allowing the controller 115 to automatically shape any transmitted signals. The controller 115 shapes transmitted signals to reduce complexity of decoding the transmitted signals when received by the downhole receiver. Processing device 124 executes computer program instructions 126 to accomplish the shaping. The shaping of transmitted signals can also be implemented in the reverse direction to make signal detection at surface easier by changing the transmitted signal shapes from the NIUs 102. Shaping transmitted signals can also be used behind inductive couplers.

Figure 4:
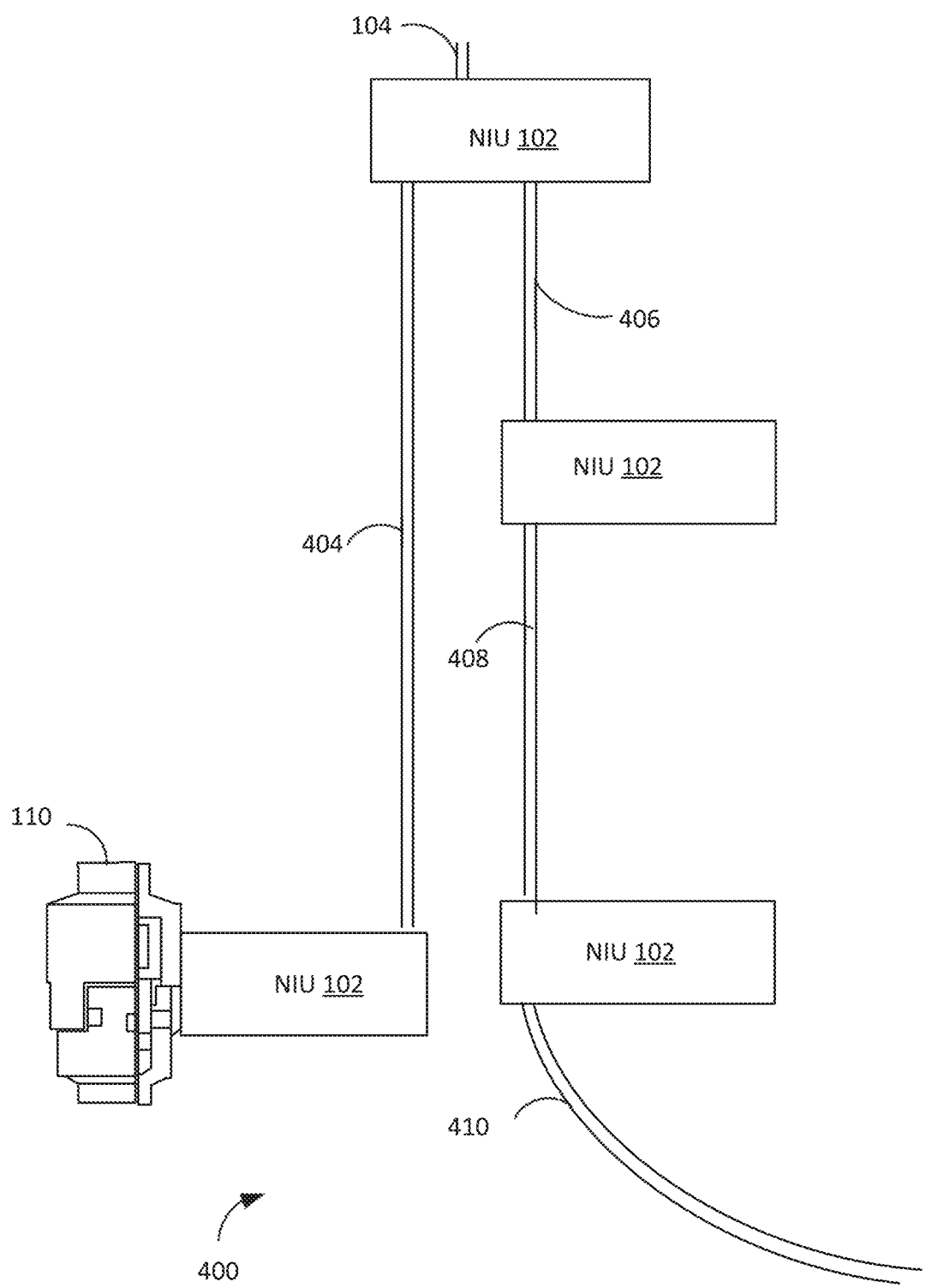
FIG. 4 depicts a portion of the system for networked communication in a wellbore according to some aspects of the disclosure.

FIG. 4 depicts a portion 400 of the system 100 for networked communication in a wellbore according to one example. In one aspect, the system includes multiple network interface units 102. The NIUs 102 may send and receive communication via power line communication along the cables such as cable 104, cable 404, cable 406, cable 408, and cable 410. In another aspect, the NIUs 102 provide network segmentation. The NIUs 102 may provide network segmentation by disconnecting the power for a designated or unstable portion of the network. For instance, in the example illustrated by FIG. 4, the downhole network has four network interface units 102. In this example, the downhole network may be segmented into portions based on the positioning of the NIUs 102. Each network interface unit 102 may contain a switch to disconnect instruments (sensors or actuators) or network segments. Only the NIU 102 needs to be powered to allow control of the connected equipment. Segments of the network being behind an inductive coupler will be disconnected by default as long as the inductive coupler is not active (antenna system not powered). A network interface unit 102 is positioned to disconnect cable 404, cable 406, cable 408, or cable 410. The controller at the surface can send commands to an NIU 102 to disconnect electrical power from a segment of the downhole network. This achieves improved system reliability and resilience of the network.

Terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above," "beneath," "less," and "greater" are intended to encompass the concept of equality, thus, "less" can mean not only "less" in the strictest mathematical sense, but also, "less than or equal to."

Unless specifically stated otherwise, it is appreciated that throughout this specification, that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, a system for downhole networking is provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a system including a controller disposable at a surface of a wellbore to send and receive messages in a power line communication format over a cable, at least one downhole device, and a network interface unit couplable to the cable. The network interface unit includes multiple interfaces for communicating downhole using differing types of native signals and a processing unit including instructions, which, when executed by the processing unit, cause the network interface unit to communicate between at least one downhole device and the controller by converting an information format between any of the differing types of native signals and a power line communication message format.

Example 2 is the system of example 1 wherein the network interface unit includes a data memory operable to store data from the at least one downhole device.

Example 3 is the system of example(s) 1-2 including a switch for controlling an electrical power connection from the cable to the at least one downhole device.

Example 4 is the system of example(s) 1-3 wherein the network interface unit includes a stored node address.

Example 5 is the system of example(s) 1-4 wherein the controller shapes a power line communication message to reduce complexity of decoding by the network interface unit.

Example 6 is the system of example(s) 1-5 wherein the network interface unit shapes a power line communication message to reduce complexity of decoding by the controller.

Example 7 is the system of example(s) 1-6 wherein the network interface unit further includes an equalizer module for compensating for a cable transfer distortion within the cable.

Example 8 is a method of communicating between a plurality of downhole devices and a controller at a surface of a wellbore. The method includes establishing, by a processing device, signaling with at least two of the downhole devices using differing types of native signals, establishing, by the processing device, communication with the controller at the surface of the wellbore using power line communication, receiving a message by the processing device, converting, by the processing device, an information format for the message between any of the differing types of native signals and a power line communication message format, and forwarding the message by the processing device.

Example 9 is the method of example 8 wherein establishing communication with the controller includes monitoring a plurality of electrical properties of a network by a network interface unit, and wherein the controller shapes the message in a power line communication format to reduce complexity of decoding.

Example 10 is the method of example(s) 8-9 wherein establishing communication with the controller includes monitoring electrical properties of a network by a network interface unit, and wherein the network interface unit shapes the message in the power line communication message format to reduce complexity of decoding.

Example 11 is the method of example(s) 8-10 wherein converting an information format between any of the differing types of native signals and power line communication format includes decoding the message from a native signal format, and encoding the message into a power line communication message format.

Example 12 is the method of example(s) 8-11 wherein the message includes at least one node address stored in a network interface unit.

Example 13 is the method of example(s) 8-12 further including receiving the message in a power line communication message format from the controller, wherein the message includes one or more additional node addresses such that the network interface unit repeats the message to at least a second network interface unit including at least one of the additional node addresses.

Example 14 is a non-transitory computer-readable medium that includes instructions that are executable by a processing device for causing the processing device to perform a method. The method includes establishing signaling with at least two downhole devices using differing types of native signals, establishing communication with a controller at a surface of a wellbore using power line communication, receiving a message, converting an information format for the message between any of the differing types of native signals and a power line communication message format, and forwarding the message.

Example 15 is the non-transitory computer-readable medium of example 14 wherein the method further includes storing data from at least one of the downhole devices.

Example 16 is the non-transitory computer-readable medium of example(s) 14-15 wherein establishing communication with the controller includes monitoring electrical properties of a network, and wherein the method further includes shaping the message in the power line communication format to reduce complexity of decoding.

Example 17 is the non-transitory computer-readable medium of example(s) 14-16 wherein converting an information format between any of the differing types of native signals and power line communication messages includes decoding a message from a native signal format, and encoding the message into the power line communication message format.

Example 18 is the non-transitory computer-readable medium of example(s) 14-17 wherein the message includes at least one node address stored in a network interface unit.

Example 19 is the non-transitory computer-readable medium of example(s) 14-18 wherein the message includes one or more additional node addresses and the method further includes repeating the message in the power line communication message format to at least a second network interface unit including at least one of the additional node addresses.

Example 20 is the non-transitory computer-readable medium of example(s) 14-19 wherein the method further includes controlling an electrical power connection from a cable to at least one of the downhole devices.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
    a computing device positionable at a surface of a wellbore to send and receive messages in a power line communication format over a cable;
    at least one downhole device; and
    a network interface unit, the network interface unit couplable between the cable and the at least one downhole device and positionable to communicate with the at least one downhole device using differing types of native signals, wherein the network interface unit comprises:
        a first interface for communicating with a first downhole device using a first type of native signal of the differing types of native signals, wherein the first type of native signal is associated with a first communication format;
        a second interface for communicating with a second downhole device using a second type of native signal of the differing types of native signals, wherein the second type of native signal is different from the first type of native signal and is associated with a second communication format that is different from the first communication format, and wherein the second interface comprises an inductive coupler communication port; and
        a processing device communicatively coupled to the first interface and the second interface, the processing device being configured to translate between communication formats by:
            converting first messages received in the first communication format from the first downhole device into a power line communication message format for transmission over the cable to the computing device;
            converting second messages received in the second communication format from the second downhole device into the power line communication message format for transmission over the cable to the computing device; and
            converting third messages received in the power line communication message format from the computing device into the first communication format or the second communication format for transmission to the first downhole device or the second downhole device, respectively.

2. The system of claim 1 wherein the network interface unit further comprises a data memory operable to store data from the at least one downhole device.

3. The system of claim 1 further comprising a switch for controlling an electrical power connection from the cable to the at least one downhole device.

4. The system of claim 1 wherein the network interface unit further comprises a stored node address.

5. The system of claim 1 wherein the computing device is configured to shape a power line communication message to reduce complexity of decoding by the network interface unit.

6. The system of claim 1 wherein the network interface unit is configured to shape a power line communication message to reduce complexity of decoding by the computing device.

7. The system of claim 1 wherein the network interface unit further comprises an equalizer module for compensating for a cable transfer distortion within the cable.

8. A method of communicating between a plurality of downhole devices and a controller at a surface of a wellbore, the method comprising:
    establishing, by a processing device of a network interface unit, signaling with a first downhole device of the plurality of downhole devices using a first type of native signal that is associated with a first communication format;
    establishing, by the processing device, signaling with a second downhole device of the plurality of downhole devices using a second type of native signal that is different from the first type of native signal and that is associated with a second communication format that is different from the first communication format, wherein the network interface unit includes a first interface coupled between the first downhole device and a cable, wherein the network interface unit includes a second interface coupled between the second downhole device and the cable, and wherein the first interface or the second interface includes an inductive coupler communication port;
    establishing, by the processing device, communication with the controller at the surface of the wellbore using power line communication over the cable;
    receiving, by the processing device, a first message in a power line communication message format over the cable;
    converting, by the processing device, the first message from the power line communication message format into the first communication format;
    forwarding, by the processing device, the first message in the first communication format to the first downhole device via the first interface using the first type of native signal;
    receiving, by the processing device, a second message in the power line communication message format over the cable;

converting, by the processing device, the second message from the power line communication message format into the second communication format;

forwarding, by the processing device, the second message in the second communication format to the second downhole device via the second interface using the second type of native signal;

receiving, by the processing device, a third message from the first downhole device via the first interface;

decoding, by the processing device, the first message from the first communication format associated with the first type of native signal;

encoding, by the processing device, the first message into the power line communication message format; and transmitting, by the processing device, the first message in the power line communication message format uphole to the controller via the cable.

9. The method of claim 8 wherein said establishing the communication with the controller comprises monitoring a plurality of electrical properties of a network by the network interface unit, and wherein the controller shapes a message in a power line communication format to reduce complexity of decoding.

10. The method of claim 8 wherein said establishing the communication with the controller comprises monitoring a plurality of electrical properties of a network by the network interface unit, and wherein the network interface unit shapes a message in the power line communication message format to reduce complexity of decoding.

11. The method of claim 8 wherein the first message includes at least one node address stored in the network interface unit.

12. The method of claim 11 further comprising:
receiving, by the processing device, a message in the power line communication message format from the controller, wherein the message includes one or more additional node addresses such that the network interface unit repeats the message to at least a second network interface unit comprising at least one of the one or more additional node addresses.

13. A non-transitory computer-readable medium that includes instructions that are executable by a processing device for causing the processing device to perform operations comprising:
establishing signaling with a first downhole device of a plurality of downhole devices using a first interface configured to communicate with the first downhole device via a first type of native signal that is associated with a first communication format;

establishing signaling with a second downhole device of the plurality of downhole devices using a second interface configured to communicate with the second downhole device via a second type of native signal that is different from the first type of native signal and that is associated with a second communication format that is different from the first communication format;

establishing communication with a controller at a surface of a wellbore using power line communication over a cable;

receiving a first message from the controller in a power line communication message format over the cable;

converting the power line communication message format into the first communication format;

forwarding the first message in the first communication format to the first downhole device via the first interface using the first type of native signal;

receiving a second message in the power line communication message format over the cable;

converting the second message from the power line communication message format into the second communication format;

forwarding the second message in the second communication format to the second downhole device via the second interface using the second type of native signal;

receiving a third message in the first communication format from the first downhole device via the first interface;

decoding the first message from the first communication format associated with the first type of native signal;

encoding the first message into the power line communication message format; and transmitting the first message in the power line communication message format uphole to the controller via the cable.

14. The non-transitory computer-readable medium of claim 13 wherein the operations further comprise storing data from at least one of the plurality of downhole devices.

15. The non-transitory computer-readable medium of claim 13 wherein said establishing the communication with the controller comprises monitoring a plurality of electrical properties of a network, and wherein the operations further comprise shaping a message in the power line communication message format to reduce complexity of decoding.

16. The non-transitory computer-readable medium of claim 13 wherein the first message includes at least one node address stored in a network interface unit that comprises the processing device.

17. The non-transitory computer-readable medium of claim 16 wherein the operations further comprise:
receiving a message in the power line communication message format from the controller, wherein the message includes one or more additional node addresses; and
repeating the message to at least a second network interface unit comprising at least one of the one or more additional node addresses.

18. The non-transitory computer-readable medium of claim 13 wherein the operations further comprise controlling an electrical power connection from the cable to at least one of the plurality of downhole devices.

* * * * *